(12) United States Patent
Subramanian et al.

(10) Patent No.: US 12,450,222 B2
(45) Date of Patent: *Oct. 21, 2025

(54) METHODS AND APPARATUS FOR DATA AND DATA REQUEST MANAGEMENT

(71) Applicant: Walmart Apollo, LLC, Bentonville, AR (US)

(72) Inventors: Sivakumar Subramanian, Karnataka (IN); Deekkan Kannan, Tamil Nadu (IN); Hari Sai Gangadhar V, Bangalore (IN); Joyan Sil, Bangalore (IN)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/603,837

(22) Filed: Mar. 13, 2024

(65) Prior Publication Data

US 2024/0220477 A1 Jul. 4, 2024

Related U.S. Application Data

(63) Continuation of application No. 17/815,683, filed on Jul. 28, 2022, now Pat. No. 11,960,466.

(30) Foreign Application Priority Data

Jun. 22, 2022 (IN) .............................. 202241035743

(51) Int. Cl.
*G06F 16/23* (2019.01)
*G06F 16/22* (2019.01)
*G06F 16/2455* (2019.01)

(52) U.S. Cl.
CPC ........ *G06F 16/235* (2019.01); *G06F 16/2282* (2019.01); *G06F 16/2456* (2019.01)

(58) Field of Classification Search
CPC . G06F 16/235; G06F 16/2282; G06F 16/2456
See application file for complete search history.

(56) References Cited

U.S. PATENT DOCUMENTS

| 7,779,042 B1 | 8/2010 | Bland et al. |
| 7,801,844 B2 * | 9/2010 | Farmer ................. G06F 16/284 707/602 |

(Continued)

*Primary Examiner* — Yuk Ting Choi
(74) *Attorney, Agent, or Firm* — Morgan Lewis & Bockius LLP; Manita Rawat

(57) ABSTRACT

This application relates to automatic processes that service data requests for information related to an item during varying temporal periods. For example, a computing device receives first attributes for an item, and generates a first surrogate key and a first super surrogate key based on the first attributes. Further, the computing device generates a first entry within a first table that includes the first surrogate key and the first super surrogate key. The computing device joins the first table to a second table based on natural keys. The computing device also receives second attributes for the item, and generates a second surrogate key for the item based on the second attributes. Further, the computing device generates a second entry within the first table that includes the second surrogate key and the first super surrogate key. The computing device also adjusts the first super surrogate key within the first entry.

11 Claims, 16 Drawing Sheets

(56) References Cited

U.S. PATENT DOCUMENTS

| | | |
|---|---|---|
| 8,180,748 B2 | 5/2012 | Farmer |
| 9,237,011 B2 | 1/2016 | Tepper |
| 9,747,359 B2 | 8/2017 | Jain |
| 11,334,549 B2 | 5/2022 | Schub et al. |
| 11,334,594 B2 | 5/2022 | Gibson |
| 11,360,994 B1 * | 6/2022 | Burgess .............. G06F 16/254 707/737 |
| 11,481,285 B1 * | 10/2022 | Kessler .............. G06F 16/2282 707/714 |
| 2007/0118524 A1 | 5/2007 | Farmer |
| 2008/0148006 A1 | 6/2008 | Fuerst et al. |
| 2009/0055439 A1 | 2/2009 | Pai et al. |
| 2013/0103691 A1 * | 4/2013 | Jain .................... G06F 16/284 707/741 |
| 2016/0055233 A1 * | 2/2016 | Wang .................. G06F 16/288 707/756 |
| 2016/0078064 A1 | 3/2016 | Sassin |
| 2016/0103880 A1 * | 4/2016 | Attaluri .............. G06F 16/2255 707/714 |
| 2018/0181581 A1 * | 6/2018 | Condict ................ G06F 16/13 707/737 |
| 2018/0253474 A1 | 9/2018 | Hoyle et al. |
| 2020/0394541 A1 * | 12/2020 | Hazard .............. G06N 3/0475 707/756 |
| 2021/0073196 A1 | 3/2021 | Schub et al. |

\* cited by examiner

Item Source 801

| op_cmpny_cd | geo_region_cd | item_id | item_desc | dept_nbr | dept_desc | dept_categ_desc |
|---|---|---|---|---|---|---|
| WMT-US | US | 86253081 | SB SWEET&SALTYALMOND | 81 | COMM BREAD | SWEET BAKED GOODS |

SSK Logic 802

| ITEM_SSK | op_cmpny_cd | GEO_REGION_ | ITEM_ID | CURR_IND |
|---|---|---|---|---|
| ▽ 10100086253081 | ▽ WMT-US | US | 86253081 | |
| 10 | 100 | ▽ 086253081 | 1 | |

SK Logic 820

| ITEM_SK | op_cmpny_cd | GEO_REGION_ | ITEM_ID | CURRENT DATE |
|---|---|---|---|---|
| ▽ 1010008625308121113 | ▽ WMT-US | US | 86253081 | 23/04/21 |
| 10 | 100 | ▽ 086253081 | ▽ 21113 | |

ITEM_DIM 840

| ITEM_SSK | ITEM_SK | op_cmpny_cd | geo_region_cd | item_id | item_desc | dept_nbr | dept_desc | dept_categ_desc | snapshot_beg_dt | snapshot_end_dt | op_cmpny_cd | curr_ind |
|---|---|---|---|---|---|---|---|---|---|---|---|---|
| 10100086253081 | ▽ 1010008625308121113 | WMT-US | US | 86253081 | SB SWEET&SALTYALMOND | 81 | COMM BREAD | SWEET BAKED GOODS | 23/04/21 | 31/12/99 | WMT-US | 1 |

841 — 802 — 820 — 803 — 807 — 805 — 809 — 811 — 823 — 825 — 804 — 808

| Fact Source | visit_nbr | store_nbr | seq_line_nbr | item_id | uom_qty | sales_amt | visit_local_dt | op_cmpny_cd | geo_region_cd |
|---|---|---|---|---|---|---|---|---|---|
| | 851 | 852 | 853 | 807 | 854 | 855 | 856 | 804 | 806 |
| 850 | 0US00417073425020210706102433 | 417 | 1 | 86253081 | 1 | 2.38 | 06/07/21 | WMT-US | US |
| | 0US02189002605120210706124657 | 2189 | 2 | 86253081 | 1 | 2.38 | 06/07/21 | WMT-US | US |

| SALES_FACT | visit_nbr | store_nbr | seq_line_nbr | ITEM_SK | ITEM_SSK | item_id | uom_qty | sales_amt | visit_local_dt | op_cmpny_cd | geo_region_cd |
|---|---|---|---|---|---|---|---|---|---|---|---|
| 860 | 851 | 852 | 853 | 820 | 802 | 807 | 854 | 855 | 856 | 804 | 806 |
| | 0US00417073425020210706102433 | 417 | 1 | 1010008625308121113 | 10100086253081 | 86253081 | 1 | 2.38 | 06/07/21 | WMT-US | US |
| | 0US02189002605120210706124657 | 2189 | 2 | 1010008625308121113 | 10100086253081 | 86253081 | 1 | 2.38 | 06/07/21 | WMT-US | US |

| Sales View With SK | visit_nbr (851) | store_nbr (852) | seq_line_nbr (853) | item_id (820) | item_desc (803) | dept_desc (809) | dept_categ_desc (811) | uom_qty (854) | sales_amt (855) | visit_local_dt (856) | op_cmpny_cd (804) | geo_region_cd (806) |
|---|---|---|---|---|---|---|---|---|---|---|---|---|
| 881 { | 0US00417073425020210706102433 | 417 | 1 | 86253081 | SWEET&SALTYALMO | COMM BREAD | SWEET BAKED GOODS | 1 | 2.38 | 06/07/21 | WMT-US | US |
| | 0US02189002605120210706124657 | 2189 | 2 | 86253081 | SWEET&SALTYALMO | COMM BREAD | SWEET BAKED GOODS | 1 | 2.38 | 06/07/21 | WMT-US | US |
| 882 { | 0US00067043089320210708172949 | 67 | 1 | 86253081 | SWEET&SALTYALMO | GROCERY DRY GOODS | READY TO EAT BREAKFAST | 1 | 2.38 | 08/07/21 | WMT-US | US |
| | 0US02015046639020210708160659 | 2015 | 2 | 86253081 | SWEET&SALTYALMO | GROCERY DRY GOODS | READY TO EAT BREAKFAST | 1 | 2.38 | 08/07/21 | WMT-US | US |

FIG. 8H — 890

| Sales View With SSK | visit_nbr (851) | store_nbr (852) | seq_line_nbr (853) | item_id (820) | item_desc (803) | dept_desc (809) | dept_categ_desc (811) | uom_qty (854) | sales_amt (855) | visit_local_dt (856) | op_cmpny_cd (804) | geo_region_cd (806) |
|---|---|---|---|---|---|---|---|---|---|---|---|---|
| 891 { | 0US00417073425020210706102433 | 417 | 1 | 86253081 | SWEET&SALTYALMO | GROCERY DRY GOODS | READY TO EAT BREAKFAST | 1 | 2.38 | 06/07/21 | WMT-US | US |
| | 0US02189002605120210706124657 | 2189 | 2 | 86253081 | SWEET&SALTYALMO | GROCERY DRY GOODS | READY TO EAT BREAKFAST | 1 | 2.38 | 06/07/21 | WMT-US | US |
| 892 { | 0US00067043089320210708172949 | 67 | 1 | 86253081 | SWEET&SALTYALMO | GROCERY DRY GOODS | READY TO EAT BREAKFAST | 1 | 2.38 | 08/07/21 | WMT-US | US |
| | 0US02015046639020210708160659 | 2015 | 2 | 86253081 | SWEET&SALTYALMO | GROCERY DRY GOODS | READY TO EAT BREAKFAST | 1 | 2.38 | 08/07/21 | WMT-US | US |

Item Source

| op_cmpny_cd | geo_region_cd | Item_id | item_desc | dept_nbr | dept_desc | dept_categ_desc |
|---|---|---|---|---|---|---|
| WMT-US | US | 86253081 | SB SWEET&SALTY ALMOND | 81 | COMM BREAD | SWEET BAKED GOODS |

SK Logic

| op_cmpny_cd | geo_region_cd | Item_id | current date | | ITEM_SK |
|---|---|---|---|---|---|
| WMT-US | US | 86253081 | 2021-04-23 | | |
| 10 | 100 | ▽086253081 | 21113 | ▽ | 10100086253081211113 |

ITEM_DIM

| ITEM_SK | Item_id | dept_nbr | item_desc | dept_desc | dept_categ_desc | strat_dt | end_dt | op_cmpny_cd | active_ind |
|---|---|---|---|---|---|---|---|---|---|
| 10100086253081211113 | 86253081 | 81 | SB SWEET&SALTY ALMOND | COMM BREAD | SWEET BAKED GOODS | 2021-04-23 | 2099-12-31 | WMT-US | 1 |

FIG. 9A

Fact Source

| visit_nbr | store_nbr | seq_line_nbr | mds_fam_id | uom_qty | sales_amt | visit_local_dt | op_cmpny_cd | geo_region_cd |
|---|---|---|---|---|---|---|---|---|
| 0US0041707342502021070610243 | 417 | 1 | 86253081 | 1 | 2.38 | 06/07/21 | WMT-US | US |
| 0US0218900260512021070612465 | 2189 | 2 | 86253081 | 1 | 2.38 | 06/07/21 | WMT-US | US |

SALES_FACT

| visit_nbr | store_nbr | seq_line_nbr | ITEM_SK | uom_qty | sales_amt | visit_local_dt | op_cmpny_cd | geo_region_cd |
|---|---|---|---|---|---|---|---|---|
| 0US0041707342502021070610243 | 417 | 1 | ▽10100086253081211113 | 1 | 2.38 | 06/07/21 | WMT-US | US |
| 0US0218900260512021070612465 | 2189 | 2 | ▽10100086253081211113 | 1 | 2.38 | 06/07/21 | WMT-US | US |

FIG. 9B

METHODS AND APPARATUS FOR DATA AND DATA REQUEST MANAGEMENT

CROSS-REFERENCE TO RELATED APPLICATIONS

This application is a continuation of U.S. patent application Ser. No. 17/815,683, filed on 28 Jul. 2022 and entitled "METHODS AND APPARATUS FOR DATA AND DATA REQUEST MANAGEMENT," which claims priority to Indian Provisional Patent Application No. 202241035743, filed on 22 Jun. 2022 and entitled "METHODS AND APPARATUS FOR DATA AND DATA REQUEST MANAGEMENT," each of which is hereby incorporated by reference in its respective entirety.

TECHNICAL FIELD

The disclosure relates generally to data management and, more specifically, to automatic processes for managing data stored within data repositories as well as managing requests for the stored data.

BACKGROUND

Businesses, such as manufacturers, shippers, and retailers, often maintain data regarding purchase transactions, inventory, inventory purchases, financial data, and other related information. Various groups within the businesses, such as a finance department or logistics department, as well as third parties, may have need of the data. The business may maintain a database that stores the information. In some instances, the requesting party may request information regarding a particular item. The item may have been sold, at one point in time, out of one department of the business (e.g., the produce department), but now is sold out of another department of the business (e.g., the bakery department). The party requesting information may be interested in information related to the item when the item was sold out of one or more of these departments. As such, businesses may benefit from automatic processes that provide such information.

SUMMARY

The embodiments may provide automatic processes that service data requests for information related to an item during varying temporal periods. For instance, the embodiments may maintain data tables, such as SQL tables, within one or more data repositories (e.g., cloud-based storage devices, servers). The tables may include dimension tables, which include item information, as well as fact tables, which include item transaction information, for example. The embodiments may perform operations to join one or more of the dimension tables with one or more of the fact tables through the use of one or more generated keys (e.g., surrogate keys). Further, the embodiments may allow client systems (e.g., downstream systems, requesting systems) to request information about an item when the item was associated with a given set of attributes (e.g., sold out of a former department) using the one or more generated keys (e.g., an "as-was" scenario). The embodiments may also allow the client systems to request information about an item with its current set of attributes (e.g., as currently sold out of its current department) using the one or more generated keys (e.g., an "as-is" scenario). Thus, the embodiments enable "as-was" and "as-is" data querying. For example, the embodiments may provide for the generation both "as-was" data requests and "as-is" data requests from client systems, and the servicing of such data requests.

As described herein, an "as-is" scenario generally refers to a case where a requesting entity is requesting item data for an item in a present state of its attributes. An "as-was" scenario, however, generally refers to a case where the requesting entity is requesting item data for the item in a previous state of its attributes (e.g., the state of the attributes at a given point in time). For example consider a hypothetical case where a video game moved from an "Electronics Department to a "Toys Department" on 1 Jan. 2022. "As-is" analysis will basically consider only the present department (i.e., "Toys Department"), and subsequent reporting/analytics will be based on the presumption that the video game is part of the present department. In an "as-was" analysis, however, the reporting/analytics will consider the video game to be part of the "Electronics Department" until 1 Jan. 2022, and then the "Toys Department" starting on that date.

Some downstream systems (e.g., client systems) employ semantic modelling that requires tables to have a single primary key for join operations (e.g., table join operations). As a result, conventional systems, at least in some examples, duplicate data and create an additional key. This results in duplicate datasets, and presents a chance that, over a period of time, the various versions may become inconsistent with each other, and further increases data maintenance costs and data security costs. To address these and other issues, the embodiments join dimension tables with fact tables, employing a surrogate key to query "as-was" item information, and a super surrogate key to query "as-is" information.

In accordance with various embodiments, exemplary systems may be implemented in any suitable hardware or hardware and software combination, such as in one or more suitable computing devices that execute instructions. For example, in some embodiments, a computing device (e.g., server) comprising at least one processor is configured to receive first attributes for an item, and generate a first surrogate key and a first super surrogate key for the item based on the first attributes. The computing device is also configured to generate a first entry within a first table that includes the first surrogate key and the first super surrogate key. Further, the computing device is configured to join the first table to a second table based on the first surrogate key and the first super surrogate key. The computing device is also configured to receive second attributes for the item, and generate a second surrogate key for the item based on the second attributes. The computing device is further configured to generate a second entry within the first table that includes the second surrogate key and the first super surrogate key. The computing device is also configured to adjust the first super surrogate key within the first entry to another value. Further, the computing device is configured to update the second table based on the first entry and the second entry of the first table.

In some embodiments, a method by at least one processor includes receiving first attributes for an item, and generating a first surrogate key and a first super surrogate key for the item based on the first attributes. The method also includes generating a first entry within a first table that includes the first surrogate key and the first super surrogate key. Further, the method includes joining the first table to a second table based on the first surrogate key and the first super surrogate key. The method also includes receiving second attributes for the item, and generate a second surrogate key for the item based on the second attributes. The method further includes generating a second entry within the first table that includes the second surrogate key and the first super surrogate key. The method also includes adjusting the first super surrogate key within the first entry to another value. Further, the method includes updating the second table based on the first entry and the second entry of the first table.

In some embodiments, a non-transitory computer readable medium has instructions stored thereon. The instructions, when executed by at least one processor, cause a device to perform operations that comprise receiving first attributes for an item, and generating a first surrogate key and a first super surrogate key for the item based on the first attributes. The operations also include generating a first entry within a first table that includes the first surrogate key and the first super surrogate key. Further, the operations include joining the first table to a second table based on the first surrogate key and the first super surrogate key. The operations also include receiving second attributes for the item, and generate a second surrogate key for the item based on the second attributes. The operations further include generating a second entry within the first table that includes the second surrogate key and the first super surrogate key. The operations also include adjusting the first super surrogate key within the first entry to another value. Further, the operations include updating the second table based on the first entry and the second entry of the first tables.

BRIEF DESCRIPTION OF THE DRAWINGS

The features and advantages of the present disclosures will be more fully disclosed in, or rendered obvious by the following detailed descriptions of example embodiments. The detailed descriptions of the example embodiments are to be considered together with the accompanying drawings wherein like numbers refer to like parts and further wherein:

FIGS. 8A, 8B, 8C, 8D, 8E, 8F, 8G, and 8H illustrate data records in accordance with some embodiments;

FIGS. 9A and 9B illustrate displays of results to a data record query in accordance with some embodiments.

DETAILED DESCRIPTION

Figure 1:
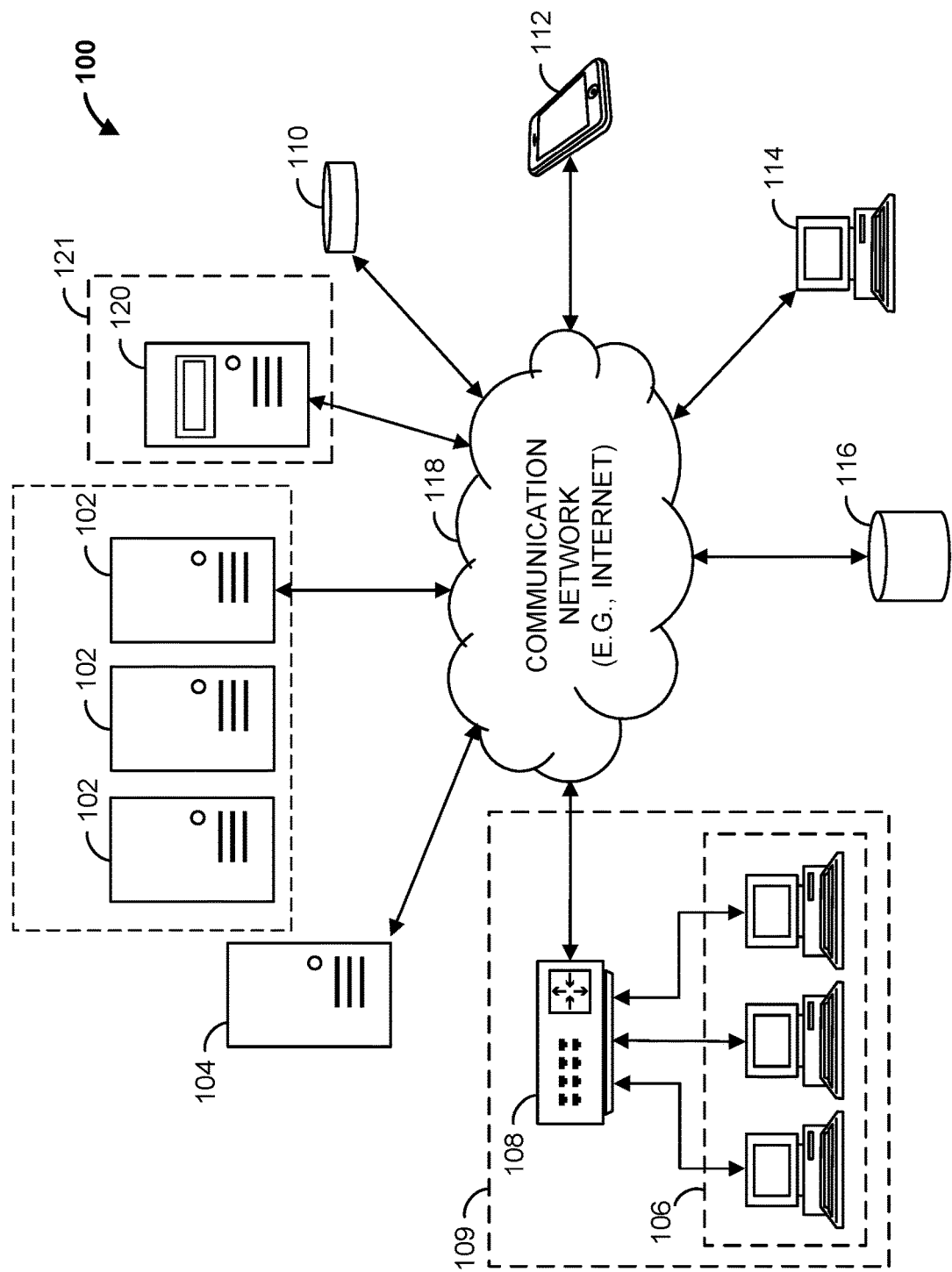
FIG. 1 is a block diagram of an data management system in accordance with some embodiments.

The description of the preferred embodiments is intended to be read in connection with the accompanying drawings, which are to be considered part of the entire written description of these disclosures. While the present disclosure is susceptible to various modifications and alternative forms, specific embodiments are shown by way of example in the drawings and will be described in detail herein. The objectives and advantages of the claimed subject matter will become more apparent from the following detailed description of these exemplary embodiments in connection with the accompanying drawings.

It should be understood, however, that the present disclosure is not intended to be limited to the particular forms disclosed. Rather, the present disclosure covers all modifications, equivalents, and alternatives that fall within the spirit and scope of these exemplary embodiments. The terms "couple," "coupled," "operatively coupled," "operatively connected," and the like should be broadly understood to refer to connecting devices or components together either mechanically, electrically, wired, wirelessly, or otherwise, such that the connection allows the pertinent devices or components to operate (e.g., communicate) with each other as intended by virtue of that relationship.

In some embodiments, a system generates and uses a super surrogate key (SSK) along with a surrogate key to enforce a single key join. The system supports semantic modelling. The surrogate key tracks every change in a dimension table and the super surrogate key (SSK) only tracks the latest record in the dimension table. Further, the super surrogate key is joined to the dimension table (categories or attributes like time, location etc., ITEM DIM table) and fact/transaction table (measures like sales, SALES FACT table). The system generates the super surrogate key with a current indicator (or active indicator) set to active (e.g., "Y," 1, etc.) when inserting any new record. In the case of an update, the system copies the super surrogate key of the existing record to a new dimensional record and updates the existing record SSK value to a default value. The system can utilize slowly changing dimensions (SCDs) type 2 table logic.

While populating the fact/transaction table, the system can join the dimension table on natural keys. The system allows end users to join surrogate keys from the fact/transaction table and the dimension table to get "as-was" information (dimension modeling approach that provides dimension information at the time of a transaction/at a given point in time). The system also allows end users to join super surrogate keys from the fact/transaction table and the dimension table to get "as-is" information (refers to the current state). The system populates a same unique key for a specific natural key when dimension changes and/or older records are updated. The system can maintain an effective start and/or end date for a record to identify the period for which the attribute was active. The system evaluates the input (i.e., source and target dimension) and dynamically generates unique numbers to populate the surrogate key and the super surrogate key. The system builds a reusable component that reads the existing tables, identifies if the input record is a new record or update to an existing record, and subsequently generates surrogate keys and/or super surrogate keys.

The super surrogate keys can be generated in multiple ways. For example, the super surrogate keys may be generated based on sequence numbers and a current indicator, maintaining same sequence numbers for any history data during the update (using sequence number). The super surrogate keys may also be generated by concatenating natural keys along with current indicator to maintain a same key (using composite key). The super surrogate keys can also be generated using a hash value of natural keys along with the current indicator.

Turning to the drawings, FIG. 1 illustrates a block diagram of an data management system 100 that includes one or more data management computing devices 102 (e.g., a server, such as an application server), web server 104, workstation(s) 106, database 116, third party client device 120, and multiple customer computing devices 110, 112, 114 operatively coupled over network 118. Data management computing device 102, workstation(s) 106, third party client device 120, and multiple customer computing devices 110, 112, 114 can each be any suitable computing device that includes any hardware or hardware and software combination for processing data. For example, each of data management computing device 102, web server 104, workstations 106, third party client device 120, and multiple customer computing devices 110, 112, 114 can include one or more processors (e.g., each processor including one or more processing cores), one or more field-programmable gate arrays (FPGAs), one or more application-specific integrated circuits (ASICs), one or more state machines, digital circuitry, or any other suitable circuitry. In addition, each can transmit data to, and receive data from, communication network 118.

In some examples, each of data management computing device 102 and third party client device 120 can be a computer, a workstation, a laptop, a server such as a cloud-based server, a distributed computing system, or one or more of any other suitable device. Each of multiple customer computing devices 110, 112, 114 can be a mobile device such as a cellular phone, a laptop, a computer, a table, a personal assistant device, a voice assistant device, a digital assistant, or any other suitable device.

Although FIG. 1 illustrates three customer computing devices 110, 112, 114, data management system 100 can include any number of customer computing devices 110, 112, 114. Similarly, data management system 100 can include any number of workstation(s) 106, data management computing devices 102, third party client devices 120, web servers 104, and databases 116. Further, a retailer 103 may employ, for example a plurality of data management computing devices 102. The plurality of data management computing devices 102 may be part of a cloud-based datacenter, for example. In some instances, a data management computing device 102 is operated by a department of the retailer (e.g., logistics, accounting, etc.). Each of the data management computing devices 102 may request data from another. For instance, a first data management computing device 102 may receive a data query from a second data management computing device 102, and the second data management computing device 102 query data tables within database 116 to obtain the requested data, and may transmit the obtained data to the first data management computing device 102.

Workstation(s) 106 are operably coupled to communication network 118 via router (or switch) 108. Workstation(s) 106 and/or router 108 may be located at a store 109, for example. In some examples, workstation 106 executes one or more applications to manage inventory at store 109. Workstation(s) 106 can communicate with data management computing device 102 over communication network 118. The workstation(s) 106 may send data to, and receive data from, data management computing device 102. For example, the workstation(s) 106 may transmit data related to a transaction, such as a purchase transaction, to data management computing device 102. Workstation(s) 106 may also communicate with web server 104. For example, web server 104 may host one or more web pages, such as a retailer's website. Workstation(s) 106 may be operable to access and program (e.g., configure) the webpages hosted by web server 104 through, for example, an Application Programming Interface (API).

Database 116 can be a remote storage device, such as a cloud-based server, a memory device on another application server, a networked computer, or any other suitable remote storage. Data management computing device 102 is operable to communicate with database 116 over communication network 118. For example, data management computing device 102 can store data to, and read data from, database 116. For instance, data management computing device 102 may store catalog information for a plurality of items, such as items sold at store 109 or on a website hosted by web server 104, within database 116. The catalog information can include, for each of the items, one or more of an item name, and item brand, an item price, an item description, an item category, or any other item attribute or information. Database 116 may further store transaction data, such as purchase transactions at store 109 or on a webpage hosted by web server 104. Although shown remote to data management computing device 102, in some examples, database 116 can be a local storage device, such as a hard drive, a non-volatile memory, or a USB stick.

Communication network 118 can be a WiFix network, a cellular network such as a 3GPP® network, a Bluetooth® network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network. Communication network 118 can provide access to, for example, the Internet.

First customer computing device 110, second customer computing device 112, and Nth customer computing device 114 may communicate with web server 104 over communication network 118. For example, web server 104 may host one or more webpages of a website. Each of multiple computing devices 110, 112, 114 may be operable to view, access, and interact with the webpages hosted by web server 104. In some examples, web server 104 hosts a web page for a retailer that allows for the purchase of items. For example, an operator of one of multiple computing devices 110, 112, 114 may access the web page hosted by web server 104, add one or more items to an online shopping cart of the web page, and perform an online checkout of the shopping cart to purchase the items.

Third party client device 120 may be operated by a third-party 121, such as an accountant, a manufacturer, a third-party seller, a supplier, or a distributor of goods. Third party client device 120 may, in some examples, request item information from data management computing device 102, as described herein. In response, data management computing device 102 may query data tables, such as data tables stored within database 116, and transmit item data to third party client device 120 in response to the request.

In some examples, data management computing device 102 generates unique numbers based on received input to populate surrogate keys and super surrogate keys (e.g., SQL keys), and employs the super surrogate keys and the surrogate keys to enforce a single key join. Data management computing device 102 may also read existing data tables (e.g., stored in database 116), identify whether an input record is a new record or an update to an existing record, and generate surrogate keys based on the input record.

For instance, database 116 may store dimension tables and fact tables. Each dimension table may identify item information, such as an item identification (ID) and various attributes of the item. Attributes of the item may include, for instance, a company ID, a geographical region (e.g., "U.S."), an item description, a department number (e.g., "23"), a department description (e.g., "Sporting Goods"), and a department catalog description (e.g., "baseball equipment"). Each fact table may identify transaction data, such as a transaction number, a store number, item numbers, quantities, sales amount, purchase date, retailer id, and a geographical region. FIG. 9A illustrates an exemplary dimension table, and FIG. 9B illustrates an exemplary fact table.

In this example, the dimension table and the fact table identify a same surrogate key (i.e., "ITEM SK").

In some examples, a dimension table identifies changes to item attributes. For instance, a dimension table may maintain one record for every attribute change that happens to a dimension (e.g., item). In addition, every record may be inserted with a unique surrogate key generated with, for example, a current indicator or an active indicator set to enabled (e.g., "Y"). Each record also maintains an effective start and end date to identify the period for which the attribute was active. In addition, there may be only one active record (e.g., current set of attributes for the item), and the end date may be set to a default value (e.g., "2099-12-31"). For an attribute update, an existing record in a dimension table may be set to inactive (e.g., "N"), and the effective end date is updated accordingly. Further, when loading fact tables (e.g., in response to a data query), the dimension table is joined on natural keys and the active indicator, and surrogate keys are populated to the fact table, so that end users can join on the surrogate key between the fact and dimension table to obtain any dimensional information.

In some examples, data management computing device 102 generates a super surrogate key using a unique sequence number only for every new entry that happens in a dimension table. For entry updates, data management computing device 102 reuses an already generated super surrogate key for an existing record, and updates the existing record's super surrogate key to a default value. In some examples, data management computing device 102 generates a super surrogate key using existing natural keys and an active indicator for new insert. n some examples, data management computing device 102 generates a super surrogate key using a hash value of existing natural keys and the active indicator for new inserts.

Figure 2:
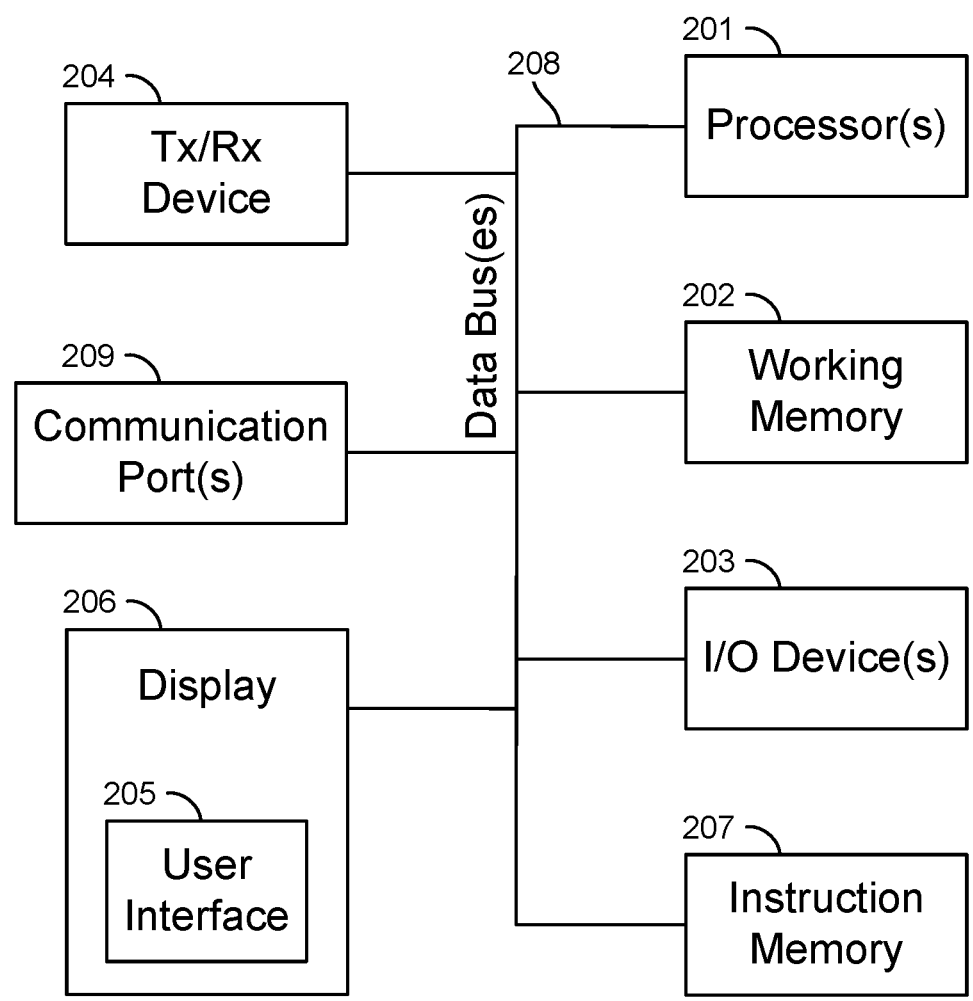
FIG. 2 is a block diagram of an exemplary data management computing device in accordance with some embodiments.

FIG. 2 illustrates an exemplary data management computing device 102 of FIG. 1. Data management computing device 102 can include one or more processors 201, working memory 202, one or more input/output devices 203, instruction memory 207, a transceiver 204, one or more communication ports 207, and a display 206, all operatively coupled to one or more data buses 208. Data buses 208 allow for communication among the various devices. Data buses 208 can include wired, or wireless, communication channels.

Processors 201 can include one or more distinct processors, each having one or more cores. Each of the distinct processors can have the same or different structure. Processors 201 can include one or more central processing units (CPUs), one or more graphics processing units (GPUs), application specific integrated circuits (ASICs), digital signal processors (DSPs), and the like.

Processors 201 can be configured to perform a certain function or operation by executing code, stored on instruction memory 207, embodying the function or operation. For example, processors 201 can be configured to perform one or more of any function, method, or operation disclosed herein.

Instruction memory 207 can store instructions that can be accessed (e.g., read) and executed by processors 201. For example, instruction memory 207 can store instructions that, when executed by one or more processors 201, cause the one or more processors 201 to perform any of the operations described herein, including training and executing any of the machine learning processes described herein. Instruction memory 207 can be a non-transitory, computer-readable storage medium such as a read-only memory (ROM), an electrically erasable programmable read-only memory (EEPROM), flash memory, a removable disk, CD-ROM, any non-volatile memory, or any other suitable memory.

Processors 201 can store data to, and read data from, working memory 202. For example, processors 201 can store a working set of instructions to working memory 202, such as instructions loaded from instruction memory 207. Processors 201 can also use working memory 202 to store dynamic data created during the operation of data management computing device 102. Working memory 202 can be a random access memory (RAM) such as a static random access memory (SRAM) or dynamic random access memory (DRAM), or any other suitable memory.

Input-output devices 203 can include any suitable device that allows for data input or output. For example, input-output devices 203 can include one or more of a keyboard, a touchpad, a mouse, a stylus, a touchscreen, a physical button, a speaker, a microphone, or any other suitable input or output device.

Communication port(s) 209 can include, for example, a serial port such as a universal asynchronous receiver/transmitter (UART) connection, a Universal Serial Bus (USB) connection, or any other suitable communication port or connection. In some examples, communication port(s) 209 allows for the programming of executable instructions in instruction memory 207. In some examples, communication port(s) 209 allow for the transfer (e.g., uploading or downloading) of data, such as transaction data.

Display 206 can display user interface 205. User interfaces 205 can enable user interaction with data management computing device 102. For example, user interface 205 can be a user interface for an application of a retailer that allows a customer to purchase one or more items from the retailer. In some examples, a user can interact with user interface 205 by engaging input-output devices 203. In some examples, display 206 can be a touchscreen, where user interface 205 is displayed on the touchscreen.

Transceiver 204 allows for communication with a network, such as the communication network 118 of FIG. 1. For example, if communication network 118 of FIG. 1 is a cellular network, transceiver 204 is configured to allow communications with the cellular network. In some examples, transceiver 204 is selected based on the type of communication network 118 data management computing device 102 will be operating in. Processor(s) 201 is operable to receive data from, or send data to, a network, such as communication network 118 of FIG. 1, via transceiver 204.

Figure 3:
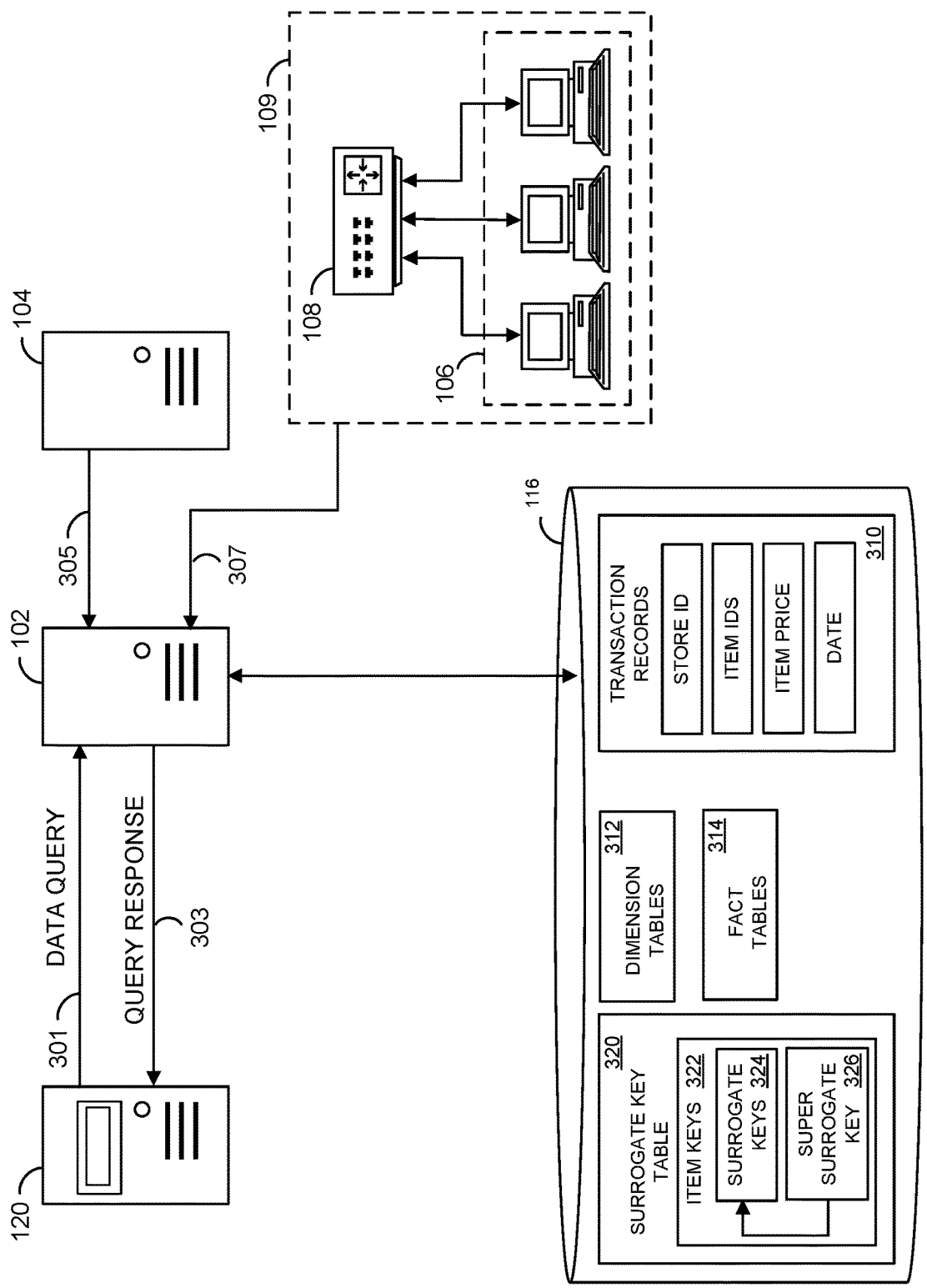
FIG. 3 illustrates portions of the data management system of FIG. 1 in accordance with some embodiments.

FIG. 3 illustrates a block diagram of exemplary portions of the data management system of FIG. 1. In this example, data management computing device 102 may receive online transaction data 305 from web server 104. Online transaction data 305 may identify and characterize purchase transactions made by customers on a website hosted by web server 104. For instance, online transaction data 305 may include item IDs, item prices, item descriptions, a purchase date, and a transaction number. Similarly, data management computing device 102 may receive store transaction data 307 from a store, such as store 109. Store transaction data 307 may identify and characterize transactions made at store 109, and may include item IDs, item prices, item descriptions, a purchase date, a store number, and a transaction number. Data management computing device 102 may parse the received online transaction data 305 and store transaction data 307 to obtain transaction data, and aggregate the parsed transaction data within transaction records 310 stored within database 116.

Data management computing device 102 may perform operations to join (e.g., SQL join) a fact table 314 to a dimension table 312 using a natural key. Each natural key may uniquely identify a record in the table. For example, database 116 may store dimension tables 312, fact tables 314, and surrogate key tables 320. In some implementations, dimension tables 312 and fact tables 314 may be SQL tables. Surrogate key table 320 may include item keys 322 for each item, such as one or more surrogate keys 324 and one or more super surrogate keys 326. A super surrogate key 326 may be associated with a surrogate key 324. For instance, data management computing device 102 may query a dimension table 312 using a super surrogate key 326, where the super surrogate key 326 appears in a same record as a surrogate key 324 associated with current attributes of the item. When an item attribute changes, data management computing device 102 may generate a new record for the item within the dimension table 312, and may include the super surrogate key 326 within the new records. Data management computing device 102 may then adjust the super surrogate key 326 of the existing record to another value, such as a default value. Thus, if management computing device 102 receives a data request identifying the same super surrogate key 326, data management computing device 102 may query the dimension table 312 and retrieve the new record (i.e., the record that includes the super surrogate key 326, as opposed to the previous record).

For example, data management computing device 102 may receive a data query request 301 from, for example, third party device 120. The data query request may identify a surrogate key 324. Data management computing device 102 may query the dimension tables 312 within database 116 (e.g., an SQL database), where the query identifies the surrogate key 324. Each record of the dimension table 312 may be associated with a unique surrogate key 324, as a new surrogate key 324 is generated for every item attribute change. As such, data management computing device 102 may retrieve the data record(s) that include the surrogate key 324 identified in the data query request 301. The retrieved data record may represent an "as-was" attribute state of the corresponding item (e.g., an attribute state that existed for the item during a temporal period). In addition, because the dimension table 312 is joined to one or more fact tables 314 (e.g., based on the natural key(s)), the retrieved data may also include one or more records from the corresponding fact tables. Data management computing device 102 may package the retrieved data record(s) within a data query response 303, and may transmit the data query response 303 to the third party device 120. As such, third party device 120 may need to maintain some records that indicate which surrogate key 322 pertains to the various records of the dimension table 312 for an item.

If, however, third party device 120 only wanted the data records for the current state of the attributes of the item (e.g., "as-is" attribute state), third party device 120 may include the super surrogate key 325 within the data query request 301, as the super surrogate key 325 always is associated with the current attributes of the item. For instance, and in response to receiving a data query request 301 that includes a super surrogate key 326, data management computing device 102 may query the dimension tables 312 based on the super surrogate key 326, and retrieve dimension table 312 records, and joined fact tables 314 records, in response to the query. The retrieved records would include only records for the item with attributes in the current state (e.g., current department, not previous department).

Figure 4:
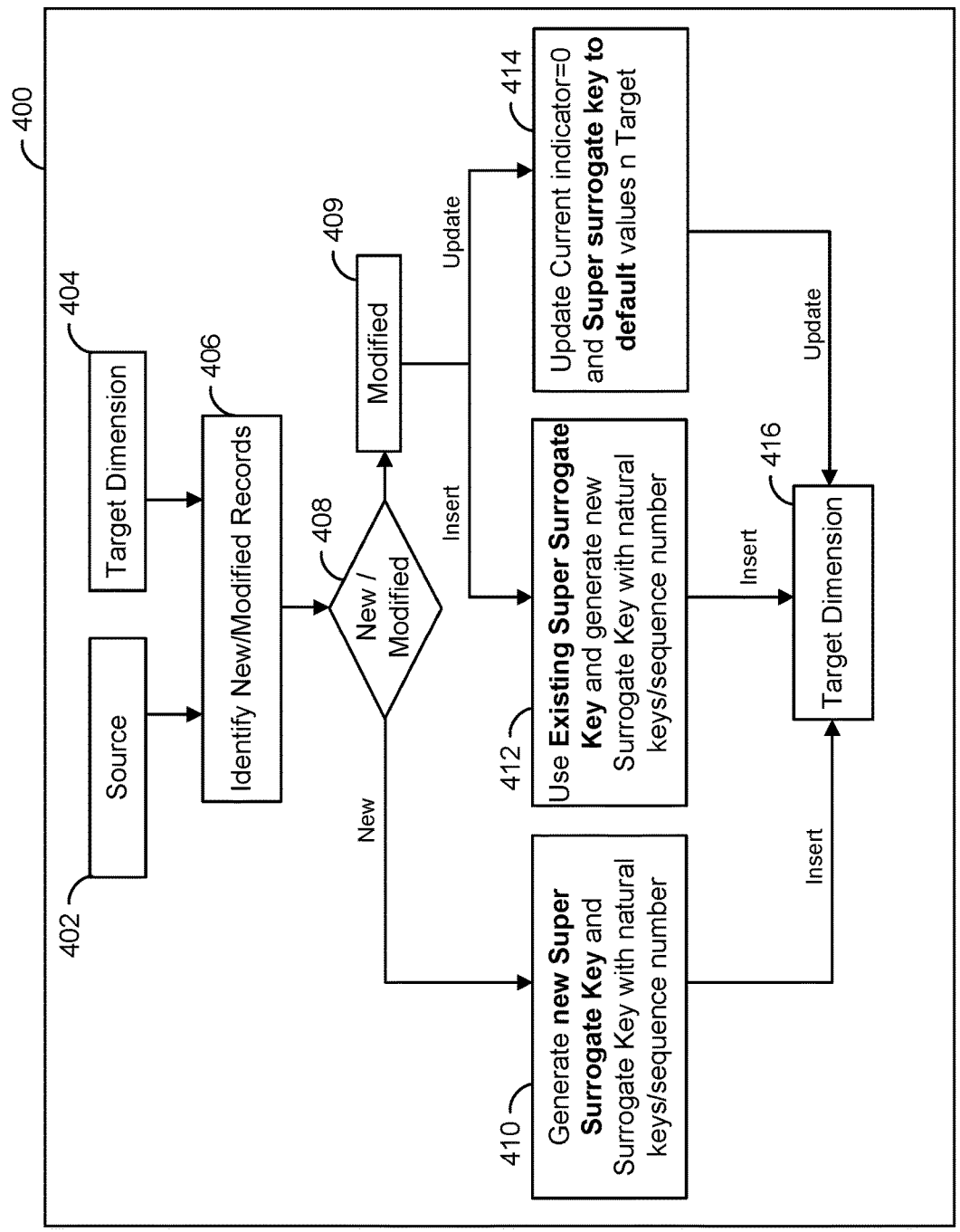
FIGS. 4, 5, 6, 7A, and 7B are flowcharts of data record processes in accordance with some embodiments.

FIG. 4 illustrates a process 400 that can be carried out by data management computing device 102 to update a dimension table, such as a dimension table 312 stored in database 116. For example, to resolve the issue of Multi Key join in SCD Type, a super surrogate key is generated for every dimension when inserting any new record. In the event of a record update, the super surrogate key of existing record is copied to the new record, and the exiting record's super surrogate key value is updated to a default value (e.g., −999). Referring to FIG. 4, a source 402 and a target dimension 404 (e.g., target dimension table) are received, and new and/or modified records are determined at step 406 based on the source 402 and target dimension 404. If a new record is determined at decision 408, a new super surrogate key is generated, as well as a surrogate key with a natural keys and/or sequence number (e.g., a natural key), at step 410. The new record is then inserted into the target dimension 404 at step 416. In at least some examples, current indicator in the new record is set to "on" (e.g., 1).

If, however, at decision 408 a modified record 409 is determined, at step 412 the existing super surrogate key is extracted from the existing record, and a new surrogate key is generated with a natural keys and/or sequence number. The new record is then inserted to the target dimension 404 at step 416. At step 414, the existing record is updated by setting the current indicator to "off" (e.g., 0), and the super surrogate key is changed to a default value. The existing record is then updated in the target dimension 404 at step 416. As such, the super surrogate key is reused, and always points to the latest change of the target dimension 404.

Figure 5:
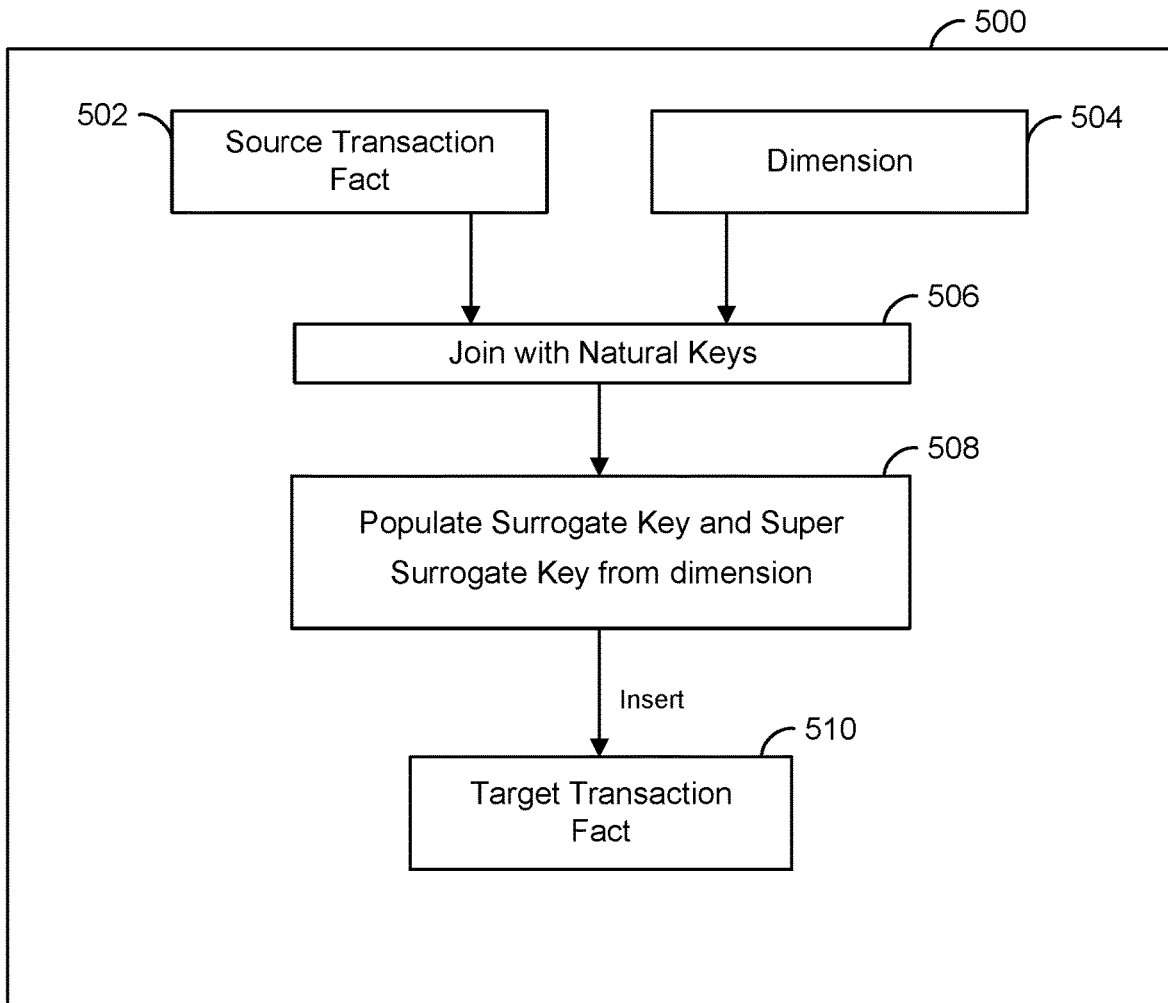

FIG. 5 illustrates a process 500 that can be carried out by data management computing device 102 to update a fact table, such as a fact table that is joined to a dimension table using natural keys. For example, a source transaction fact 502 (e.g., a fact table) and a dimension 504 (e.g., a dimension table) are stored in a database, such as database 116. At step 506 the transaction fact 502 is joined with natural keys to dimension 504. Further, at step 508 the source transaction fact 502 is updated with the surrogate key and the super surrogate key from the dimension 504, and the updated data is inserted into the target transaction fact 510. In this example, the target transaction fact 510 (e.g., fact table) may include one data field that identifies the super surrogate key, and another data field that identifies the surrogate key.

Figure 6:
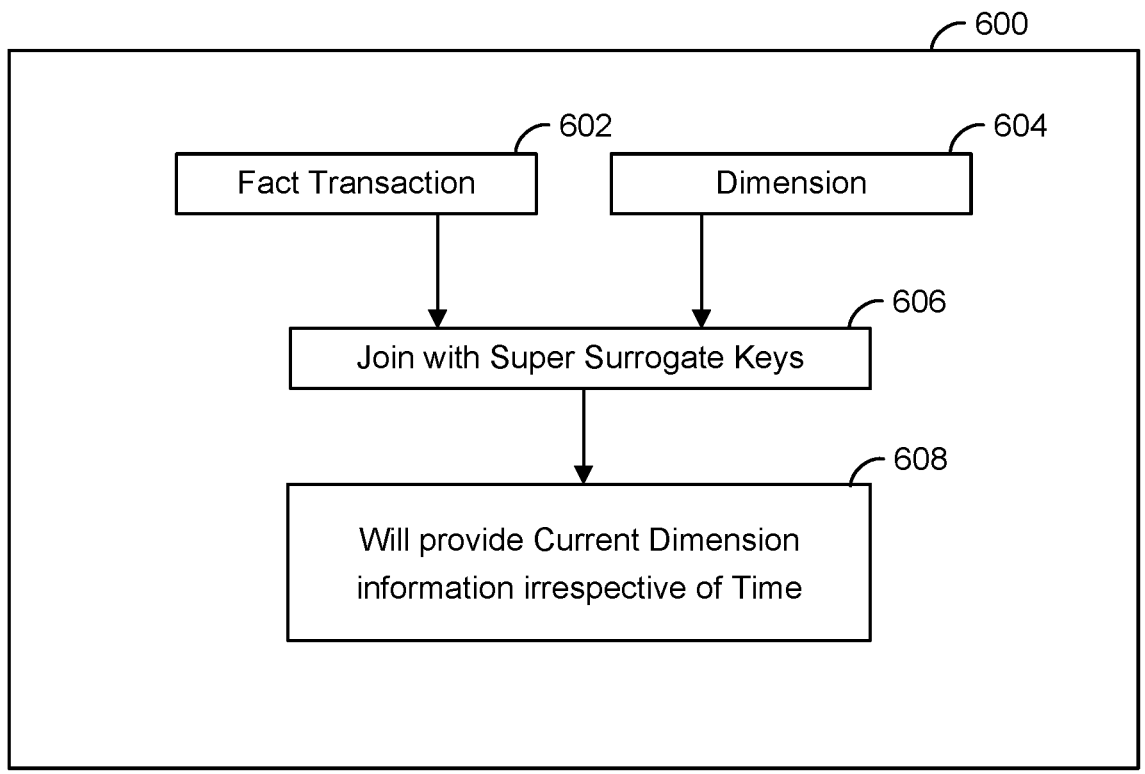

FIG. 6 illustrates a process 600 that can be carried out by data management computing device 102 to join a fact table with a dimension table using a super surrogate key (e.g., in an "as-is" scenario). In this example, a transaction fact 602 (e.g., a fact table) and a dimension 604 (e.g., a dimension table) are stored in a database. The transaction fact 602 is joined (e.g., an SQL join) with the dimension 604 using a super surrogate key, such as super surrogate key 326. Further, and at step 608, in response to a data query (e.g., an SQL data query) that identifies the super surrogate key, data management computing device 102 may retrieve current dimension data, such as dimension data for a corresponding item as associated with its current attributes, as well as corresponding fact data (e.g., transactions that took place with the item associated with its current attributes).

Figure 7A:
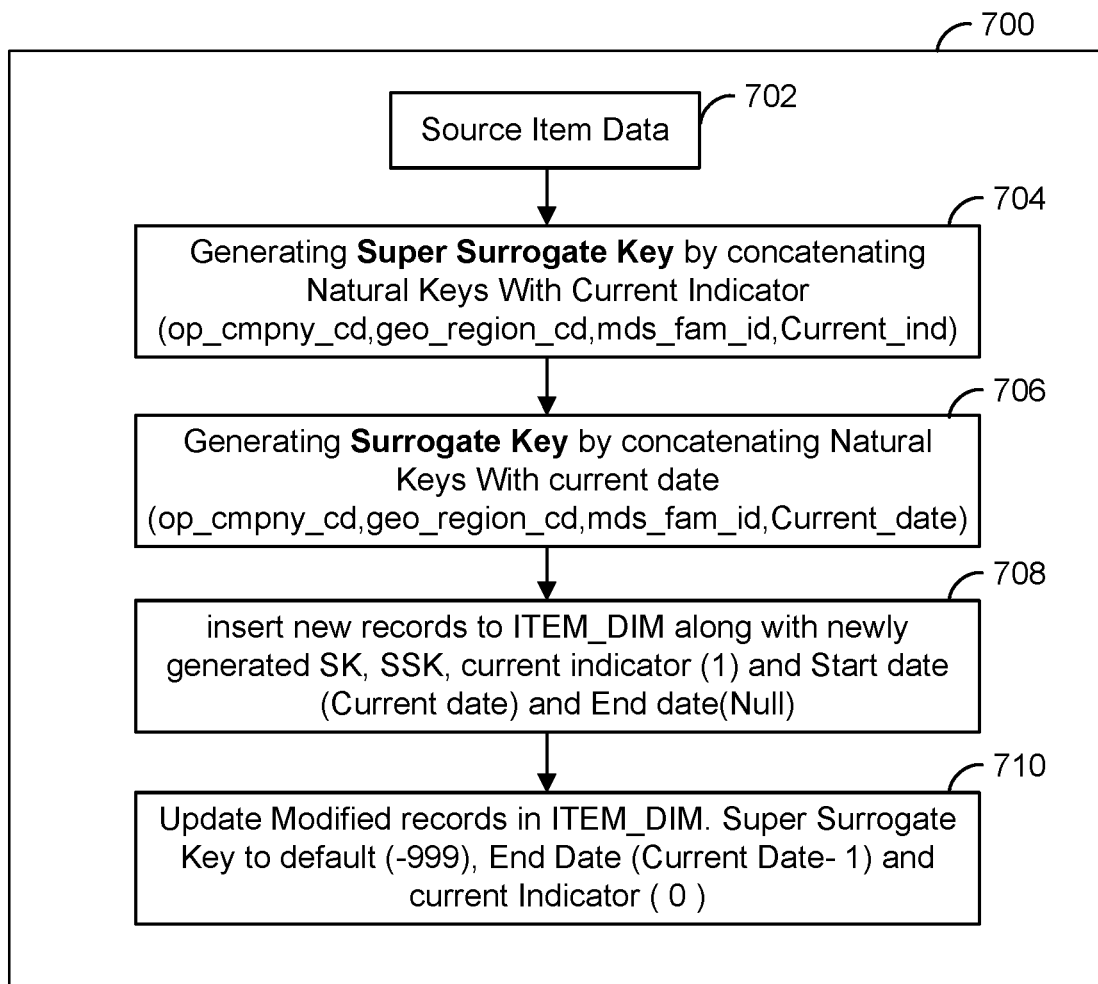

FIG. 7A illustrates a process 700 that can be carried out by data management computing device 102 to generate a new record for an item within a dimension table. The new record may identify new attributes of the item, for example. At step 704, source item data 702 to be inserted into an item database is received. A super surrogate key is generated by concatenating natural keys with a current indicator. For instance, data management computing device 102 may concatenate a company ID, a geographical region ID, a family ID, and a current indicator (e.g., indicating whether the corresponding item attributes are current for the item) to generate the super surrogate key.

At step 706, a surrogate key is generated by concatenating natural keys with a current date. For instance, data management computing device 102 may concatenate a company ID, a geographical region ID, a family ID, and a current date (e.g., Aug. 12, 2021) to generate the surrogate key. Further, at step 708, a new record is inserted into the item database. The new record includes the generated super surrogate key, the surrogate key, a start date (e.g., the current date, Aug. 12, 2021), and an end date, which may be set to a default value as it is unknown at this point (e.g., NULL). Further, a current indicator is set to indicate the record is the current record (e.g., "ON," 1). At step 710, existing records in the item database are modified. For example, the super surrogate key for existing record is updated to a default value (e.g., –999), an end date is updated to, in this example, the day before the current date (Aug. 11, 2021), and the current indicator is set to indicate the existing record is not current (e.g., "OFF," 0).

Figure 7B:
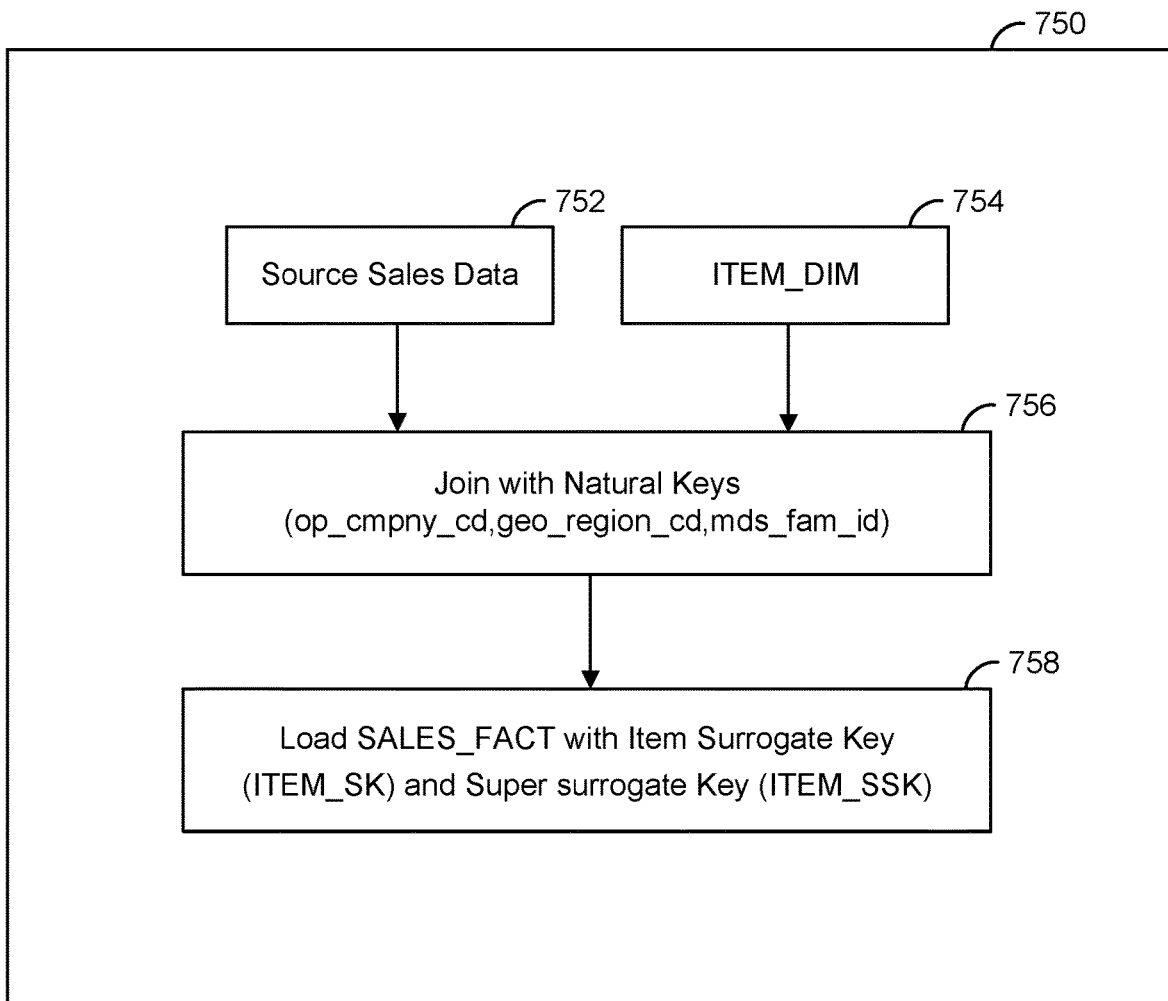

FIG. 7B illustrates a process 750 that can be carried out by data management computing device 102 to load fact data from a fact table. At step 756, item database 754 is joined with a fact table, such as source sales data 752, using natural keys. For example, the item database 754 may be joined using a concatenated key that concatenates a company ID, a geographical ID, and a family ID. At step 758, the fact table is loaded using an item surrogate key and a super surrogate key.

Figure 8E:
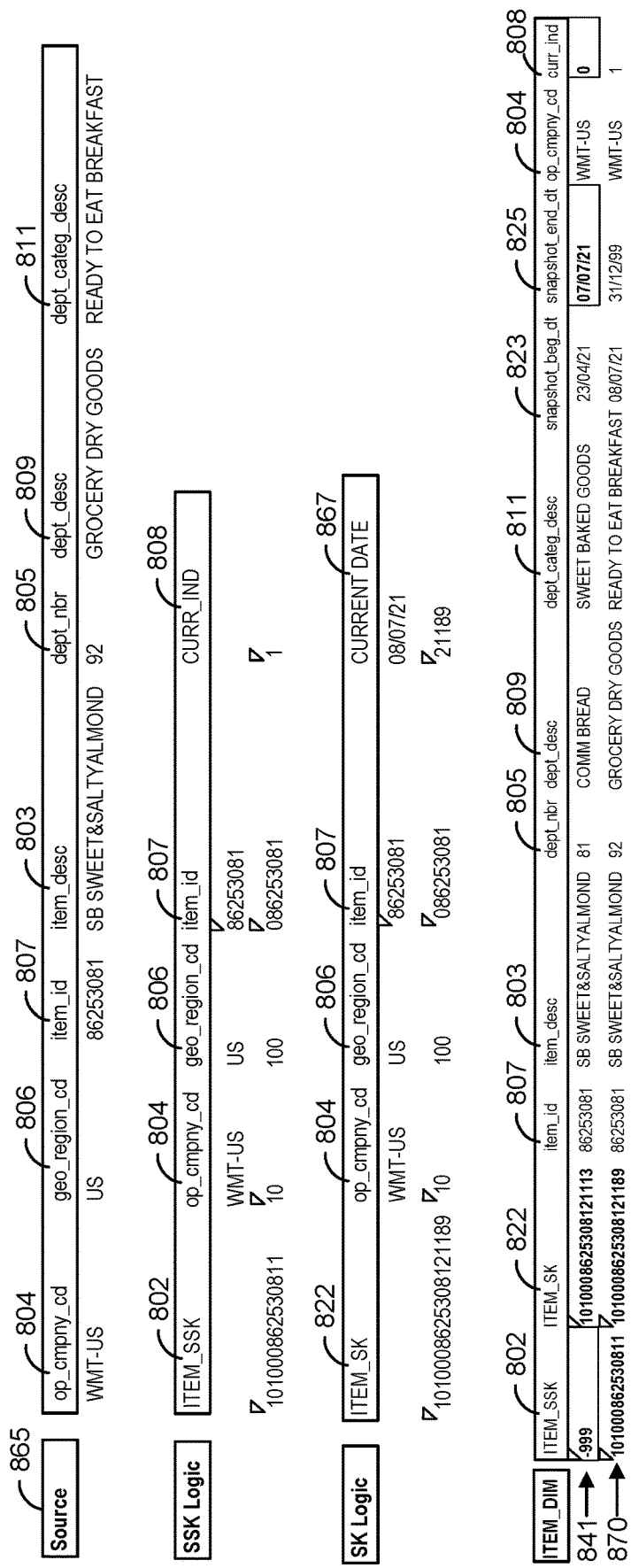

As an example, FIGS. 8A-8H illustrate the updating of records within a dimension table and fact table that are joined using natural keys, such as the dimension table and fact table of FIGS. 9A and 9B. For these examples, assume there is a new item "SB SWEET & SALTY ALMOND" which is getting introduced on Apr. 23, 2021 and is assigned to the "comm bread department," and a department category description of "sweet baked goods." FIG. 8A illustrates an item data record 801 for the item. The item data record 801 includes a company ID 804, a geographical region 806, an item ID 807, an item description 803, an department number 805, a department description 809, and a department category description 811.

Data management computing device 102, to insert the new item data record into a dimension table, generates a new surrogate key and a new super surrogate key. As illustrated in FIG. 8B, data management computing device 102 may generate a super surrogate key (ITEM SSK) 802 based on a company ID 804, a geographical region 806, an item ID 807, and a current indicator 808. For instance, data management computing device 102 may concatenate the company ID 804, the geographical region 806, the item ID 807, and the current indicator 808 to generate the super surrogate key 802. In this example, a company ID 804 of "10," a geographical region 806 of "100" (which corresponds to the "US"), an item ID 807 of "086253081," and a current indicator of "1" are concatenated to form a super surrogate key 802 of "101000862530811."

Further, data management computing device 102 may generate a surrogate key 820 based on the company ID 804, the geographical region 806, the item ID 807, and a current date 822 (of Apr. 22, 2021). For instance, data management computing device 102 may concatenate the company ID 804, the geographical region 806, the item ID 807, and the current date 822 to generate the surrogate key 820. In this example, the company ID 804 of "10," the geographical region 806 of "100" (which corresponds to the "US"), the item ID 807 of "086253081," and a current date of "21113" (which corresponds to a date of 23 Apr. 2021) are concatenated to form a surrogate key 822 of "1010008625308121113."

Data management computing device 102 may insert an item data record 841 to a dimension table 840 that includes the super surrogate key 822 and the surrogate key 820. Further, the item data record 840 includes the current date 823, a default end date 825 of Dec. 31, 2099, and an active indicator 808 of "1" (to indicate it is the "current" record for the item), as illustrated in FIG. 8C. Item data record 840 also includes the item ID 807, the item description 803, the department number 805, the department description 809, and the department category description 811.

As illustrated in FIG. 8D, fact table (SALES FACT) 860 is loaded with the new super surrogate key 802 and the new surrogate key 822 for all transaction records 850 of the item by joining on natural keys (e.g., SQL join). Each transaction record 850 includes, for example, a visit number 851, a store number 852, a sequence line number 853, an item ID 807, a quantity 854, a sales amount 855, a visit date 856, the company ID 804, and the geographical region 806.

Referring to FIG. 8E, assume there is an update 865 to the item on Jul. 8, 2021, where the department description item attribute was changed to indicate the item was moved from the "COMM Bread department" to the "Grocery Dry Goods Department," as indicated by the department description 809. Data management computing device 102 may insert into the dimension table a new data record 870 with a new surrogate key 822 using natural keys (company ID 804, geographical region 806, and item ID 807) and the current date 822. The new data record 870 also includes the super surrogate key (which is copied from the existing record 841), and a current indicator 808 that is set to 1 to indicate it is the current record for the item. In the existing record 841, the item super surrogate key 802 is set to a default value (e.g., –999), the end date 825 is set to the current date (Jul. 8, 2021), and the current indicator 808 is set to 0 to indicate it is not the current record for the item.

Figure 8F:
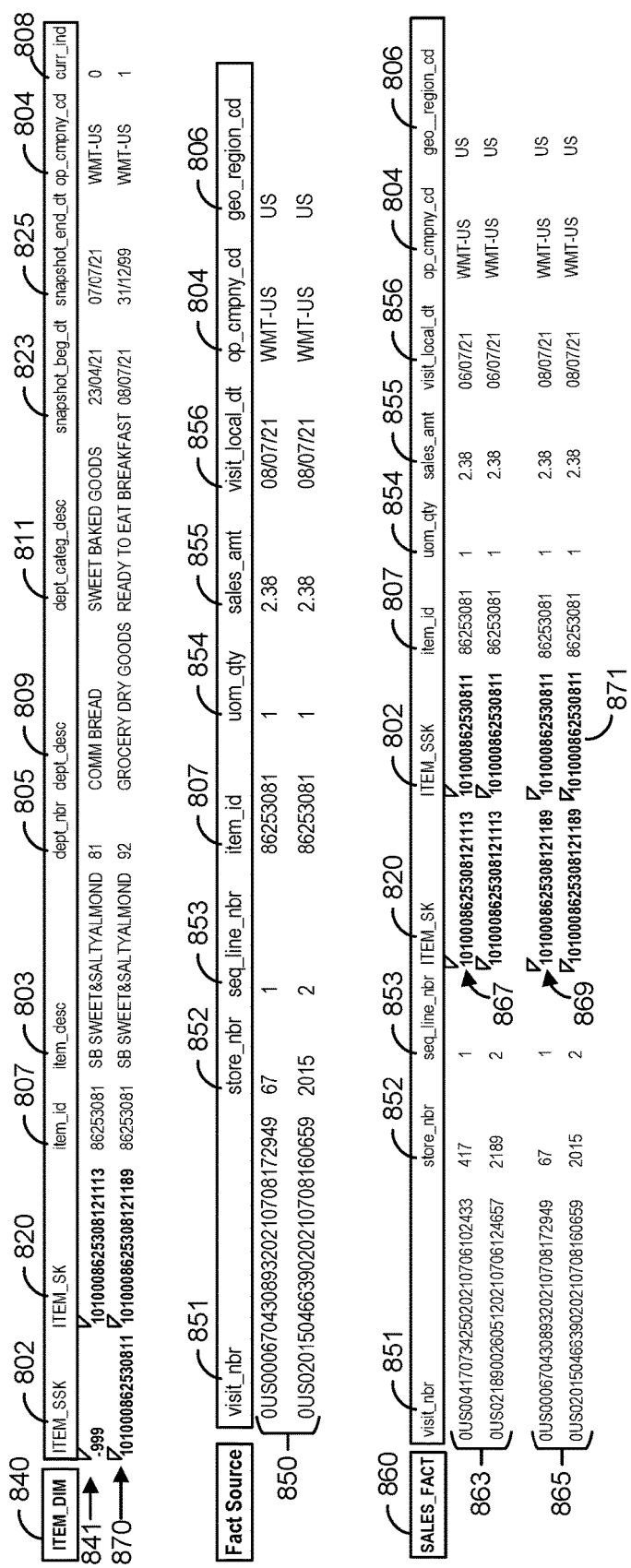

FIG. 8F illustrates the fact table (SALES FACT) 860 with the original data records 863 and with new data records 865 as determined from transactions 850 that took place on Jul. 8, 2021. Although the original data records 863 include a first surrogate key 867 and new data records 865 have a second surrogate key 869, they all include the same super surrogate key 871. The data records may be retrieved in response to, for instance, one or more data queries 301.

For instance, FIG. 8G illustrates a display 880 of records that may be generated in response to multiple data queries 301 that specify the first surrogate key 867 and the second surrogate key 869. For example, in response to a data query 301 that identifies the first surrogate key 867, data management computing device 102 may retrieve data records 881 associated with first surrogate key 867, which indicate "comm bread" for the department description 809 of the item and "sweet baked goods" for the department category description 811, as that was the department and category description for the item during those transactions that took place Jul. 6, 2021 ("as-was" scenario). Further, in response to a data query 301 that identifies the second surrogate key 869, data management computing device 102 may also retrieve data records 882 associated with second surrogate key 869, which indicate "grocery dry goods" for the department description 809 of the item and "ready to eat breakfast" for the department category description 811, as that is the current department and category description for the item, and the transactions took place on Jul. 8, 2021, after the attribute change took effect.

In contrast, if a requesting entity wanted to see the same transactions but associated with the item's current attributes regardless of when the transactions took place, the requesting entity may generate a data query 301 that includes the super surrogate key 871. In response, data management computing device 102 may retrieve data records 891, which includes the same transactions as indicated in data records 881 and data records 882, but with all transactions showing the current attributes for the item. For instance, as illustrated in FIG. 8H, all of the data records 891 indicate "grocery dry goods" for the department description 809 of the item and "ready to eat breakfast" for the department category description 811.

Figure 10A:
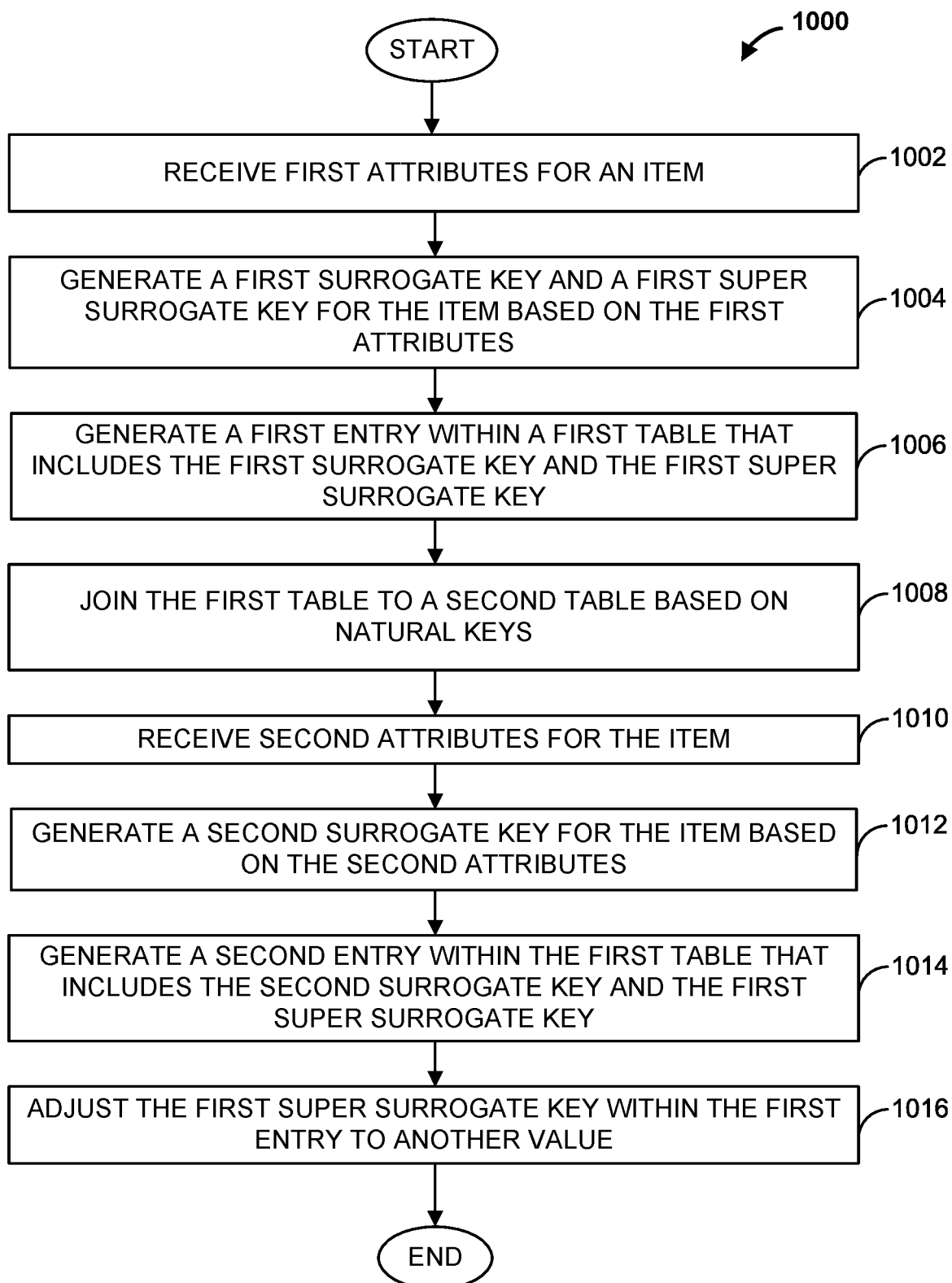
FIGS. 10A and 10B are flowcharts of example methods that can be carried out by the data management system 100 of FIG. 1 in accordance with some embodiments.

FIG. 10A is a flowchart of an example method 1000 that can be carried out by the data management computing device 102 of FIG. 1. For instance, one or more processors 201 may receive executable instructions from instruction memory 207, and may execute the instructions to carry any the steps of method 1000. Beginning at step 1002, data management computing device 102 receives first attributes for an item. Data management computing device 102 generates a first surrogate key and a first super surrogate key for the item based on the first attributes. For instance, data management computing device 102 may concatenate a company ID, a geographical region ID, a family ID, and a current indicator generate the super surrogate key. Further, data management computing device 102 may concatenate a company ID, a geographical region ID, a family ID, and a current date to generate the surrogate key.

At step 1006, data management computing device 102 may generate a first entry within a first table (e.g., a dimension table) that includes the first surrogate key and the first super surrogate key (e.g., such as item data record 841). Data management computing device 102 may join (e.g., using an SQL join) the first table to a second table (e.g., a fact table) using natural keys at step 1008.

Further, and at step 1010, data management computing device 102 may receive second attributes for the item. For instance, the second attributes may characterize an updated department of the item. At step 1012, data management computing device 102 generates a second surrogate key for the item based on the second attributes. Proceeding to step 1014, data management computing device 102 generates a second entry within the first table that includes the second surrogate key and the first surrogate key. At step 1016, data management computing device 102 adjusts the first super surrogate key within the first entry to another value. For example, data management computing device 102 may set the first super surrogate key to a default value (e.g., 0, –999, etc.).

Figure 10B:
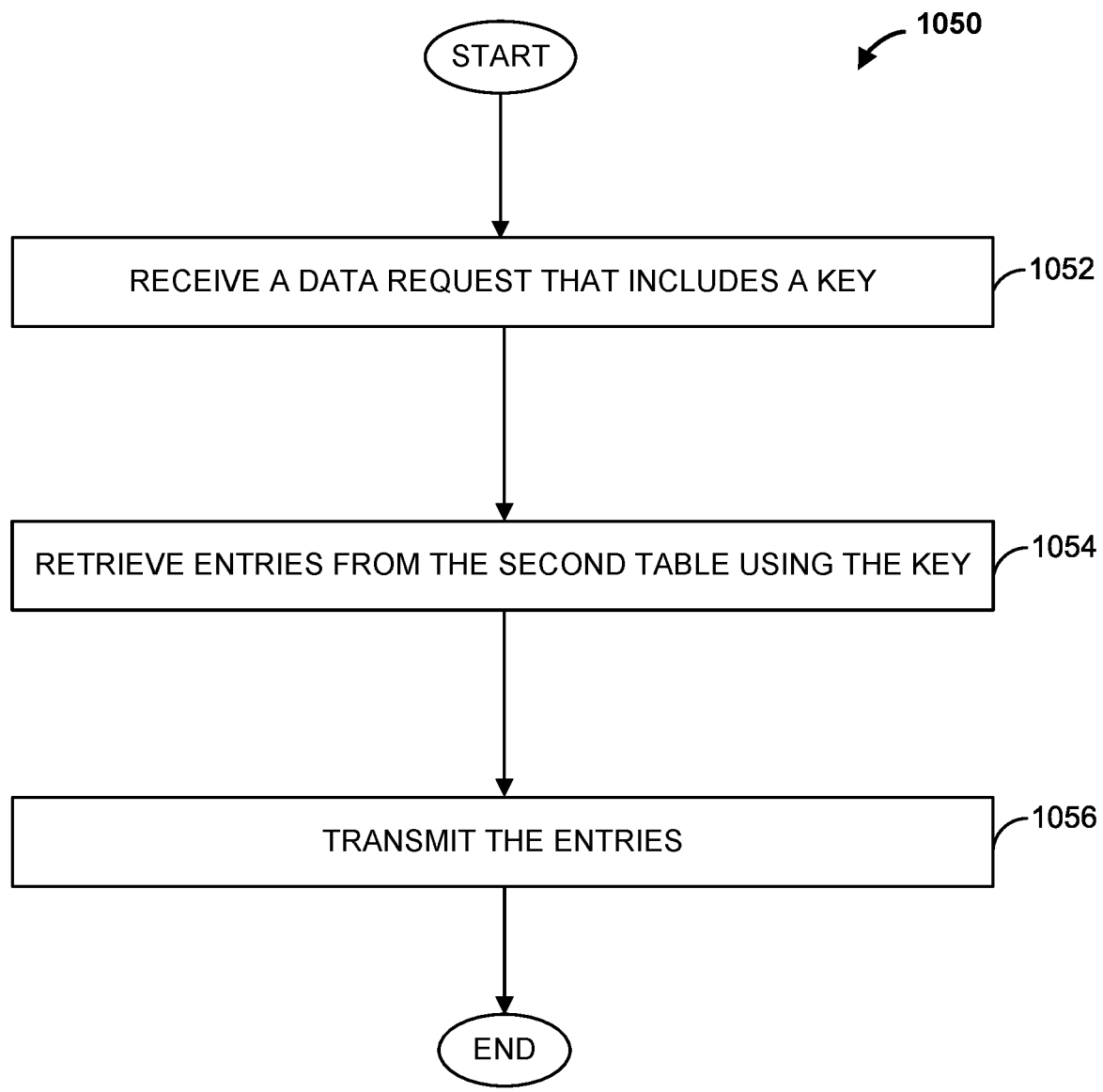

FIG. 10B is a flowchart of an example method 1050 that can be carried out by the data management computing device 102 of FIG. 1. For instance, one or more processors 201 may receive executable instructions from instruction memory 207, and may execute the instructions to carry any the steps of method 1050. Beginning at step 1052, data management computing device 102 receives a data request that includes a key. For example, data management computing device 102 may receive a data query 301 from a third party client device 120. The data query 301 may identify surrogate key, or a super surrogate key, for instance.

At step 1054, data management computing device 102 retrieves entries from the first table and the joined second table using the key. For instance, in response to a data query 301 that identifies a surrogate key, data management computing device 102 may retrieve data records from the first table and from the joined second table that include the surrogate key. In response to a data query 301 that identifies a super surrogate key, data management computing device 102 may retrieve data records from the first table and from the joined second table that include the super surrogate key. At step 1056, data management computing device 102 transmits the retrieved data records (e.g., to third party client device 120).

Although the methods described above are with reference to the illustrated flowcharts, it will be appreciated that many other ways of performing the acts associated with the methods can be used. For example, the order of some operations may be changed, and some of the operations described may be optional.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The foregoing is provided for purposes of illustrating, explaining, and describing embodiments of these disclosures. Modifications and adaptations to these embodiments will be apparent to those skilled in the art and may be made without departing from the scope or spirit of these disclosures.

What is claimed is:

1. A system comprising:
   a database;
   a processor; and
   a non-transitory memory storing instructions that, when executed, cause the processor to:
   receive a first set of attributes for an item;
   generate a first surrogate key by concatenating a first plurality of the first set of attributes and a first non-attribute value;
   generate a first super surrogate key by concatenating a second plurality of the first set of attributes and a current indicator;
   generate a first record in the database comprising the first surrogate key and the first super surrogate key;
   receive a second set of attributes for the item;
   generate a second surrogate key by concatenating a first plurality of the second set of attributes and a second non-attribute value;
   generate a second record in the database comprising the second surrogate key and the first super surrogate key;
   in response to generating the second record, overwrite the first super surrogate key of the first record with a value other than the first super surrogate key, wherein the first super surrogate key is overwritten by setting the first super surrogate key to a different value; and receive a data request comprising a key;

wherein when the key is the first super surrogate key, retrieve either the first record or the second record based on when the data request is received, wherein:

the first record is retrieved when the data request is received before the second record is generated and when a current indicator value of the first record indicates the first record is a current record; and the second record is retrieved when the data request is received after the second record is generated, and after the first super surrogate key is overwritten, and when a current indicator value of the second record indicates the second record is a current record.

2. The system of claim 1, wherein the instructions cause the processor to:

when the key is the first surrogate key, retrieve the first record from the database; and transmit, in response to the data request, at least a portion of the first record.

3. The system of claim 2, wherein the instructions cause the processor to:

when the key is the second surrogate key, retrieve the second record from the database; and transmit, in response to the data request, at least a portion of the second entry.

4. The system of claim 1, wherein the instructions cause the processor to adjust the first super surrogate key value of the first record to a default value.

5. A computer-implemented method, comprising:

receiving a first set of attributes for an item;

generating a first surrogate key by concatenating a first plurality of the first set of attributes and a first non-attribute value;

generating a first super surrogate key by concatenating a second plurality of the first set of attributes and a current indicator;

generating a first record in a database comprising the first surrogate key and the first super surrogate key;

receiving second set of attributes for the item;

generating a second surrogate key by concatenating a first plurality of the second set of attributes and a second non-attribute value;

generating a second record in the database comprising the second surrogate key and the first super surrogate key;

in response to generating the second record, overwriting the first super surrogate key of the first record with a value other than the first super surrogate key, wherein the first super surrogate key is overwritten by setting the first super surrogate key to a different value; and receiving a data request comprising a key;

wherein when the key is the first super surrogate key, retrieve either the first record or the second record based on when the data request is received, wherein:

the first record is retrieved when the data request is received before the second record is generated and when a current indicator value of the first record indicates the first record is a current record; and the second record is retrieved when the data request is received after the second record is generated, and after the first super surrogate key is overwritten, and when a current indicator value of the second record indicates the second record is a current record.

6. The computer-implemented method of claim 5, comprising:

when the key is the first surrogate key, retrieving a first entry associated with the first record from the database; and transmitting, in response to the data request, at least a portion of the first record.

7. The computer-implemented method of claim 6, comprising:

when the key is the second surrogate key, retrieving the second record from the database; and transmitting, in response to the data request, at least a portion of the second record.

8. The computer-implemented method of claim 5, comprising adjusting the first super surrogate key value of the first record to a default value.

9. A non-transitory computer readable medium having instructions stored thereon that, when executed by at least one processor, cause at least one device to perform operations comprising:

receiving a first set of attributes for an item;

generating a first surrogate key by concatenating a first plurality of the first set of attributes and a first non-attribute value;

generating a first super surrogate key by concatenating a second plurality of the first set of attributes and a current indicator;

generating a first record in a database comprising the first surrogate key and the first super surrogate key;

receiving second set of attributes for the item;

generating a second surrogate key by concatenating a first plurality of the second set of attributes and a second non-attribute value;

generating a second record in the database comprising the second surrogate key and the first super surrogate key;

in response to generating the second record, overwriting the first super surrogate key of the first record with a value other than the first super surrogate key, wherein the first super surrogate key is overwritten by setting the first super surrogate key to a different value; and receiving a data request comprising a key;

wherein when the key is the first super surrogate key, retrieve either the first record or the second record based on when the data request is received, wherein:

the first record is retrieved when the data request is received before the second record is generated and when a current indicator value of the first record indicates the first record is a current record; and the second record is retrieved when the data request is received after the second record is generated, and after the first super surrogate key is overwritten, and when a current indicator value of the second record indicates the second record is a current record.

10. The non-transitory computer readable medium of claim 9, wherein the instructions cause the device to perform operations comprising:

when the key is the first surrogate key:

retrieving the first record from the database; and transmitting, in response to the data request, at least a portion of the first record; and when the key is the second surrogate key:

retrieving the second record from the database; and transmitting, in response to the data request, at least a portion of the second record.

11. The non-transitory computer readable medium of claim 9, wherein the instructions cause the device to perform operations comprising adjusting the first super surrogate key value of the first record to a default value.

\* \* \* \* \*